United States Patent
Rains, Jr. et al.

(10) Patent No.: US 7,374,311 B2
(45) Date of Patent: *May 20, 2008

(54) OPTICAL INTEGRATING CHAMBER LIGHTING USING MULTIPLE COLOR SOURCES FOR LUMINOUS APPLICATIONS

(75) Inventors: Jack C. Rains, Jr., Oak Hill, VA (US); Christopher Bates, Oak Hill, VA (US); Matthew Brown, Falls Church, VA (US)

(73) Assignee: Advanced Optical Technologies, LLC, Herndon, VA (US)

( * ) Notice: Subject to any disclaimer, the term of this patent is extended or adjusted under 35 U.S.C. 154(b) by 155 days.

This patent is subject to a terminal disclaimer.

(21) Appl. No.: 10/558,480

(22) PCT Filed: Apr. 25, 2005

(86) PCT No.: PCT/US2005/014092

§ 371 (c)(1),
(2), (4) Date: Nov. 28, 2005

(87) PCT Pub. No.: WO2005/106963

PCT Pub. Date: Nov. 10, 2005

(65) Prior Publication Data

US 2006/0268543 A1 Nov. 30, 2006

(51) Int. Cl.
*F21V 33/00* (2006.01)
(52) U.S. Cl. .............. 362/234; 362/249; 362/812; 40/550; 40/564; 40/581; 40/583
(58) Field of Classification Search ............... 362/800, 362/812, 234, 249, 247; 40/541, 550, 551, 40/552, 564, 574, 581, 582, 583
See application file for complete search history.

(56) References Cited

U.S. PATENT DOCUMENTS 1,911,576 A * 5/1933 Le Gorre .................... 40/575
4,677,533 A   6/1987 McDermott et al.

(Continued)

OTHER PUBLICATIONS

International Preliminary Report on Patentability, issued Nov. 1, 2006 concerning International Application No. PCT/US2005/014092, filed on Apr. 25, 2005, and the Written Opinion of the International Searching Authority.

(Continued)

*Primary Examiner*—Laura Tso
(74) *Attorney, Agent, or Firm*—McDermott Will & Emery LLP

(57) ABSTRACT

A system provides light of selectable spectral characteristic (e.g. a selectable color combination of light), for luminous applications such as signage and indicator lights. An optical integrating cavity combines energy of different wavelengths from different sources, typically different-color LEDs. The cavity has a diffusely reflective interior surface and an aperture for allowing emission of combined light. Control of the intensity of emission of the sources sets the amount of each wavelength of light in the combined output and thus determines a spectral characteristic of the light output through the aperture. A deflector shaped like a number, character, letter, or other symbol, may be coupled to a similarly shaped aperture. By combining several such fixtures, it is possible to spell out words and phrases, with selectable color lighting. Disclosed fixture examples use an extruded body member with appropriately located reflective surfaces, to form both the cavity and deflector.

32 Claims, 6 Drawing Sheets

U.S. PATENT DOCUMENTS

| | | | |
|---|---|---|---|
| 4,962,687 A | 10/1990 | Belliveau et al. |
| 4,992,704 A | 2/1991 | Stinson |
| 5,241,459 A | 8/1993 | Kaplan et al. |
| 5,365,084 A | 11/1994 | Cochran et al. |
| 5,400,228 A | 3/1995 | Kao |
| 5,420,482 A | 5/1995 | Phares |
| 5,471,052 A | 11/1995 | Ryczek |
| 5,650,843 A | 7/1997 | Moberg et al. |
| 5,752,766 A | 5/1998 | Bailey et al. |
| 5,838,247 A | 11/1998 | Bladowski |
| 5,877,490 A | 3/1999 | Ramer et al. |
| 5,899,557 A | 5/1999 | Sato |
| 5,914,487 A | 6/1999 | Ramer et al. |
| 6,007,209 A | 12/1999 | Pelka |
| 6,007,225 A | 12/1999 | Ramer et al. |
| 6,016,038 A | 1/2000 | Mueller et al. |
| 6,084,250 A | 7/2000 | Justel et al. |
| 6,127,783 A | 10/2000 | Pashley et al. |
| 6,139,166 A | 10/2000 | Marshall et al. |
| 6,149,283 A | 11/2000 | Conway et al. |
| 6,150,774 A | 11/2000 | Mueller et al. |
| 6,166,496 A | 12/2000 | Lys et al. |
| 6,183,086 B1 | 2/2001 | Neubert |
| 6,184,628 B1 | 2/2001 | Ruthenberg |
| 6,200,002 B1 | 3/2001 | Marshall et al. |
| 6,211,626 B1 | 4/2001 | Lys et al. |
| 6,222,172 B1 | 4/2001 | Fossum et al. |
| 6,222,623 B1 | 4/2001 | Wetherell |
| 6,238,077 B1 | 5/2001 | Ramer et al. |
| 6,257,737 B1 | 7/2001 | Marshall et al. |
| 6,266,136 B1 | 7/2001 | Ramer et al. |
| 6,273,589 B1 | 8/2001 | Weber et al. |
| 6,280,054 B1 | 8/2001 | Cassarly et al. |
| 6,286,979 B1 | 9/2001 | Ramer et al. |
| 6,292,901 B1 | 9/2001 | Lys et al. |
| 6,299,329 B1 | 10/2001 | Mui et al. |
| 6,334,700 B2 | 1/2002 | Ramer et al. |
| 6,340,868 B1 | 1/2002 | Lys et al. |
| 6,342,695 B1 | 1/2002 | Ramer et al. |
| 6,357,889 B1 | 3/2002 | Duggal et al. |
| 6,357,893 B1 | 3/2002 | Belliveau |
| 6,441,558 B1 | 8/2002 | Muthu et al. |
| 6,459,919 B1 | 10/2002 | Lys et al. |
| 6,488,389 B2 | 12/2002 | Cassarly et al. |
| 6,523,977 B2 | 2/2003 | Chuang et al. |
| 6,525,668 B1 | 2/2003 | Petrick |
| 6,527,411 B1 | 3/2003 | Sayers |
| 6,528,954 B1 | 3/2003 | Lys et al. |
| 6,533,429 B2 | 3/2003 | Yoneda |
| 6,547,416 B2 | 4/2003 | Pashley et al. |
| 6,548,867 B2 | 4/2003 | Dowling et al. |
| 6,577,080 B2 | 6/2003 | Lys et al. |
| 6,608,453 B2 | 8/2003 | Morgan et al. |
| 6,624,597 B2 | 9/2003 | Dowling et al. |
| 6,626,558 B2 | 9/2003 | Momot et al. |
| 6,636,003 B2 | 10/2003 | Rahm et al. |
| 6,659,622 B2 | 12/2003 | Katogi et al. |
| 6,692,136 B2 | 2/2004 | Marshall et al. |
| 6,700,112 B2 | 3/2004 | Brown |
| 6,717,376 B2 | 4/2004 | Lys et al. |
| 6,720,745 B2 | 4/2004 | Lys et al. |
| 6,744,223 B2 | 6/2004 | Laflamme et al. |
| 6,759,814 B2 | 7/2004 | Vogel et al. |
| 6,774,584 B2 | 8/2004 | Lys et al. |
| 6,777,891 B2 | 8/2004 | Lys et al. |
| 6,781,329 B2 | 8/2004 | Mueller et al. |
| 6,788,011 B2 | 9/2004 | Mueller et al. |
| 6,793,374 B2 | 9/2004 | Begemann |
| 6,801,003 B2 | 10/2004 | Schanbarger et al. |
| 6,806,659 B1 | 10/2004 | Mueller et al. |
| 6,836,083 B2 | 12/2004 | Mukai |
| 6,840,652 B1 | 1/2005 | Hymer |
| 6,869,204 B2 | 3/2005 | Morgan et al. |
| 6,883,929 B2 | 4/2005 | Dowling |
| 6,888,322 B2 | 5/2005 | Dowling et al. |
| 6,897,624 B2 | 5/2005 | Lys et al. |
| 6,936,978 B2 | 8/2005 | Morgan et al. |
| 6,965,205 B2 | 11/2005 | Piepgras et al. |
| 6,967,448 B2 | 11/2005 | Morgan et al. |
| 6,969,954 B2 | 11/2005 | Lys |
| 6,975,079 B2 | 12/2005 | Lys et al. |
| 6,995,355 B2 | 2/2006 | Rains, Jr. et al. |
| 7,012,382 B2 | 3/2006 | Cheang et al. |
| 7,014,336 B1 | 3/2006 | Ducharme et al. |
| 7,031,920 B2 | 4/2006 | Dowling et al. |
| 7,038,398 B1 | 5/2006 | Lys et al. |
| 7,038,399 B2 | 5/2006 | Lys et al. |
| 7,042,172 B2 | 5/2006 | Dowling et al. |
| 7,064,498 B2 | 6/2006 | Dowling et al. |
| 7,108,413 B2 | 9/2006 | Kwong et al. |
| 7,121,690 B1 | 10/2006 | Ramer et al. |
| 7,144,131 B2 | 12/2006 | Rains |
| 7,145,125 B2 | 12/2006 | May et al. |
| 7,148,470 B2 | 12/2006 | Rains, Jr. et al. |
| 7,157,694 B2 | 1/2007 | May et al. |
| 2002/0064043 A1 | 5/2002 | Ariga et al. |
| 2003/0076056 A1 | 4/2003 | Schuurmans |
| 2003/0117798 A1 | 6/2003 | Voser |
| 2003/0193816 A1 | 10/2003 | Rahn |
| 2004/0156199 A1 | 8/2004 | Rivas et al. |
| 2004/0160199 A1 | 8/2004 | Morgan et al. |
| 2005/0040774 A1 | 2/2005 | Mualler et al. |
| 2005/0062446 A1 | 3/2005 | Ashdown |
| 2005/0063063 A1 | 3/2005 | Ashdown |
| 2005/0156103 A1 | 7/2005 | May et al. |
| 2005/0161586 A1 | 7/2005 | Rains et al. |
| 2006/0001381 A1 | 1/2006 | Robinson et al. |
| 2006/0028156 A1 | 2/2006 | Jungwtrth |

OTHER PUBLICATIONS

Inventor's Declaration for Compliance with Duty of Disclosure under 37 CFR §§ 1.56 with exhibits. U.S. Office Action issued in U.S. Appl. No. 11/233,036, dated May 30, 2007.

"Developmental Product Technical Date Bulletin" Ferro Corporation-Specialty Plastics Group, Filled and Reinforced Plastics Division, Evansville, IN, Jan. 2002.

"Industrial Equipment News . . . The Leading Publisher of New Products Worldwide" IEN, Apr. 2003, www.inquiryexpress.com.

"Holographic Diffusers", EO Edmund Industrial Optics, avaliable at http://www.edmundoptics.com/onlinecatalog/DisplayProduct.cfm?productid-1363, Apr. 2004.

"Source Four Revolution", 2003.

Steigerwald, Daniel A., et al. "Illumination with Solid State Lighting Technology." IEEE Journal on Selected Topics in Quantum Electronics, Vol. 8, No. 2, Mar./Apr. 2002, pp. 310-320.

Xiang, Hector. "efg's Chromaticity Diagrams Lab Report." URL: http//www.efg2.com/Lab/Graphics/Colors/Chromaticity.htm pp. 1-15. Feb. 2005.

Tawil, Joe, et al. "Colorimetry." URL: http://www.cameraguild.com/technology/colorimetry.htm. pp. 1-13, Apr. 2003.

LSI unveils the LumeLEX™ ARC06, Lighting Services Inc., Product News, printed from http://www.lightingservicesinc.com/press_article.asp?pressID=103 on Feb. 16, 2006.

Brent York, "Bridging the Gap for LEDs in the Architectural and Lighting Markets", TIR Systems Ltd., Blue 2005, May 16-19.

Leonard Hordyk, Commercializing Innovative SSL Technology: From the Laboratory to Lighting, TIR Systems Ltd., Strategies in Light, Feb. 16, 2006.

Grant Harlow, "Workshop 4: LED Technology, Bridging the Gap: From LEDs to Lighting", TIR Systems Ltd., LightFair, Apr. 11, 2005.

\* cited by examiner

US 7,374,311 B2

OPTICAL INTEGRATING CHAMBER LIGHTING USING MULTIPLE COLOR SOURCES FOR LUMINOUS APPLICATIONS

This application is the U.S. National Phase under 35 U.S.C. §371 of International application No. PCT/US2005/014092, filed Apr. 25, 2005, and claims the benefit of U.S. application Ser. No. 10/832,464, filed Apr. 27, 2004, now U.S. Pat. No. 6,995,355 issued Feb. 7, 2006.

TECHNICAL FIELD

The present subject matter relates to techniques and equipment to provide light having a selectable spectral characteristic (e.g. a selectable color characteristic), by combining selected amounts of light energy of different wavelengths from different sources, using an optical cavity, particularly for luminous applications such as signage, indicator lights and the like.

BACKGROUND

May luminous lighting applications, for signage or indicator lights or the like, would benefit from precisely controlled spectral characteristic of the radiant energy. It has long been known that combining the light of one color with the light of another color creates a third color. For example, the commonly used primary colors Red, Green and Blue of different amounts can be combined to produce almost any color in the visible spectrum. Adjustment of the amount of each primary color enables adjustment of the spectral properties of the combined light stream. Recent developments for selectable color systems have utilized light emitting diodes as the sources of the different light colors.

Light emitting diodes (LEDs) were originally developed to provide visible indicators and information displays. For such luminance applications, the LEDs emitted relatively low power. However, in recent years, improved LEDs have become available that produce relatively high intensities of output light. These higher power LEDs, for example, have been used in arrays for traffic lights. Today, LEDs are available in almost any color in the color spectrum.

Systems are known which combine controlled amounts of projected light from at least two LEDs of different primary colors. Attention is directed, for example, to U.S. Pat. Nos. 6,459,919, 6,166,496 and 6,150,774. Typically, such systems have relied on using pulse-width modulation or other modulation of the LED driver signals to adjust the intensity of each LED color output. The modulation requires complex circuitry to implement. Also, such prior systems have relied on direct radiation or illumination from the individual source LEDs. In some applications, the LEDs may represent undesirably bright sources if viewed directly. Also, the direct illumination from LEDs providing multiple colors of light has not provided optimum combination throughout the field of illumination. In some systems, the observer can see the separate red, green and blue lights from the LEDs at short distances from the fixture, even if the LEDs are covered by a translucent diffuser. Integration of colors by the eye becomes effective only at longer distances.

Another problem arises from long-term use of LED type light sources. As the LEDs age, the output intensity for a given input level of the LED drive current decreases. As a result, it may be necessary to increase power to an LED to maintain a desired output level. This increases power consumption. In some cases, the circuitry may not be able to provide enough light to maintain the desired light output level. As performance of the LEDs of different colors declines differently with age (e.g. due to differences in usage), it may be difficult to maintain desired relative output levels and therefore difficult to maintain the desired spectral characteristics of the combined output. The output levels of LEDs also vary with actual temperature (thermal) that may be caused by difference in ambient conditions or different operational heating and/or cooling of different LEDs. Temperature induced changes in performance cause changes in the spectrum of light output.

U.S. Pat. No. 6,007,225 to Ramer et al. (Assigned to Advanced Optical Technologies, L.L.C.) discloses a directed lighting system utilizing a conical light deflector. At least a portion of the interior surface of the conical deflector has a specular reflectivity. In several disclosed embodiments, the source is coupled to an optical integrating cavity; and an outlet aperture is coupled to the narrow end of the conical light deflector. This patented lighting system provides relatively uniform light intensity and efficient distribution of light over a field of illumination defined by the angle and distal edge of the deflector. However, this patent does not discuss particular color combinations or effects.

Hence, a need still exists for a technique to efficiently combine energy from multiple sources having multiple wavelengths and direct the radiant energy effectively toward a desired field of illumination, particularly for luminous lighting applications. A related need still exists for such a system that does not require complex electronics (e.g. modulation circuitry) to control the intensity of the energy output from the sources of the radiant energy of different wavelengths. A need also exists for a technique to effectively maintain a desired energy output level and the desired spectral character of the combined output as LED performance decreases with age, preferably without requiring excessive power levels.

SUMMARY

Lighting fixtures disclosed herein use an optical cavity, having a diffusely reflective interior surface and an aperture for allowing emission of combined radiant energy. Sources supply radiant energy into the interior of the cavity. At least two of the sources emit radiant energy of different wavelengths. The cavity effectively combines the energy of the different wavelengths, so that the radiant energy emitted through the aperture includes the radiant energy of the various wavelengths. The apparatus also includes a deflector for directing the combined light output in a desired manner.

For luminous applications, the deflector and typically the aperture will have the shape of a number, character, letter, or symbol. Several of these fixtures may be used together to spell out a word or phrase, and the color of each component of the word or phrase may be selectively controlled. Examples are disclosed in which the fixture is formed using an extruded body member. Interior surfaces of the extruded member, having appropriate reflectivity, form the cavity and the deflector.

Hence, a lighting fixture, for a luminous lighting application, might include first and second light sources providing light of first and second wavelengths. This fixture further includes an optical cavity having a diffusely reflective interior surface. The integrating cavity receives and combines light of the two different wavelengths from the sources. An aperture allows emission of combined light, including both the wavelengths. This fixture also has a reflective deflector shaped like a number, character, letter, or symbol. A proximal opening of the deflector is coupled to the aperture of the optical cavity. The deflector directs the combined light emitted through the aperture so as to provide a luminous representation of the number, character, letter, or symbol.

In a somewhat different aspect, a lighting fixture might include first and second light sources providing light of first and second wavelengths and an extruded body member. The diffusely reflective optical integrating cavity is formed by a first reflective interior surface of the extruded body member. Again, the cavity receives and combines the light of the two different wavelengths and emits the combined light through an aperture. This fixture also includes a reflective deflector formed by a second reflective interior surface of the extruded body member. The deflector has a proximal opening coupled to the aperture of the optical integrating cavity, and it directs the combined light emitted through the aperture to a desired region.

A system using a lighting fixture as disclosed herein will include a control circuit, coupled to the sources for establishing output intensity of radiant energy of each of the sources. Control of the intensity of emission of the sources sets a spectral characteristic of the combined radiant energy emitted through the aperture.

In the examples, the points of entry of the energy from the sources into the cavity are located so that the emission points are not directly visible through the aperture. Each source typically comprises one or more light emitting diodes (LEDs). It is possible to install any desirable number of LEDs. Hence, In several examples, the sources may comprise one or more LEDs for emitting light of a first color, and one or more LEDs for emitting light of a second color, wherein the second color is different from the first color. In a similar fashion, the apparatus may include additional LED sources of a third color, a fourth color, etc. To achieve the highest color-rendering index (CRI), the LED array may include LEDs of colors that effectively cover the entire visible spectrum.

The sources can include any color or wavelength, but typically include red, green, and blue. The integrating or mixing capability of the optical cavity serves to project light of any color, including white light, by adjusting the intensity of the various sources coupled to the cavity. Hence, it is possible to control color rendering index, as well as color temperature. The system works with the totality of light output from a family of LEDs. However, to provide color adjustment or variability, it is not necessary to control the output of individual LEDs, except as the intensity of each contributes to the totality. For example, it is not necessary to modulate the LED outputs. Also, the distribution pattern of the LEDs is not significant. The LEDs can be arranged in any manner to supply radiant energy within the optical cavity, although typically direct view from outside the fixture is avoided.

Other examples are disclosed which include one or more white light sources. The white light source may be one or more white LEDs. Alternatively, such fixtures may utilize other light sources or lamps, such as incandescent or fluorescent light bulbs. In fixtures utilizing white light sources, the light from the colored LEDs provides an adjustment or correction to the white light output of the apparatus.

An exemplary system includes a number of "sleeper" LEDs that would be activated only when needed, for example, to maintain the light output, color, color temperature or thermal temperature. Hence, examples are also disclosed in which the first color LEDs comprise one or more initially active LEDs for emitting light of the first color and one or more initially inactive LEDs for emitting light of the first color on an as needed basis. Similarly, the second color LEDs include one or more initially active LEDs for emitting light of the second color and one or more initially inactive LEDs for emitting light of the second color on an as needed basis. In a similar fashion, the apparatus may include additional active and inactive LED sources of a third color, fourth color, etc. or active and inactive LED sources of white light.

As noted in the background, as LEDs age or experience increases in thermal temperature, they continue to operate, but at a reduced output level. The use of the sleeper LEDs greatly extends the lifecycle of the fixtures. Activating a sleeper (previously inactive) LED, for example, provides compensation for the decrease in output of the originally active LED. There is also more flexibility in the range of intensities that the fixtures may provide.

A number of different examples of control circuits are discussed below. In one example, the control circuitry comprises a color sensor coupled to detect color distribution in the combined radiant energy. Associated logic circuitry, responsive to the detected color distribution, controls the output intensity of the various LEDs, so as to provide a desired color distribution in the integrated radiant energy. In an example using sleeper LEDs, the logic circuitry is responsive to the detected color distribution to selectively activate the inactive light emitting diodes as needed, to maintain the desired color distribution in the combined light.

A number of other control circuit features also are disclosed. For example, the control circuitry may also include a temperature sensor. In such an example, the logic circuitry is also responsive to the sensed temperature, e.g. to reduce intensity of the source outputs to compensate for temperature increases. The control circuitry may include an appropriate device for manually setting the desired spectral characteristic, for example, one or more variable resistors or one or more dip switches, to allow a user to define or select the desired color distribution. Automatic controls also are envisioned. For example, the control circuitry may include a data interface coupled to the logic circuitry, for receiving data defining the desired color distribution. Such an interface would allow input of control data from a separate or even remote device, such as a personal computer, personal digital assistant or the like. A number of the devices, with such data interfaces, may be controlled from a common central location or device.

The control may be somewhat static, e.g. set the desired color reference index or desired color temperature and the overall intensity and leave the device set-up in that manner for an indefinite period. The apparatus also may be controlled dynamically, for example, to vary the color of the combined light output and thereby provide special effects lighting. Also, such light settings are easily recorded and reused at a later time or even at a different location using a different system.

The disclosed apparatus may use a variety of different structures or arrangements for the optical integrating cavity. It is desirable that the interior cavity surface have a highly efficient diffusely reflective characteristic, e.g. a reflectivity of over 90%, with respect to the relevant wavelengths. In several examples, the cavity is formed of a diffusely reflective plastic material, such as a polypropylene having a 98% reflectivity and a diffuse reflective characteristic. Another example of a material with a suitable reflectivity is SPECTRALON. Alternatively, the optical integrating cavity may comprise a rigid substrate having an interior surface, and a diffusely reflective coating layer formed on the interior surface of the substrate so as to provide the diffusely reflective interior surface of the optical integrating cavity.

A variety of different shapes may be used for the interior reflective surface of the cavity. Although it may be triangular or in the shape of a pyramid, in several examples, the diffusely reflective interior surface of the optical integrating cavity has an extended volume having a rectangular cross-section. Other examples utilize a cavity shape corresponding to a substantial portion of a sphere (e.g. hemispherical) or a substantial portion of a cylinder (e.g. approximating a half-cylinder).

The disclosed devices have numerous applications, and the output intensity and spectral characteristic may be tailored and/or adjusted to suit the particular application. For example, the intensity of the integrated radiant energy emitted through the aperture may be at a level for use in a rumination application or at a level sufficient for a task lighting application. Exemplary luminous lighting systems provide symbol, letter number or character display lighting, for example, for signage.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

Figure 1:
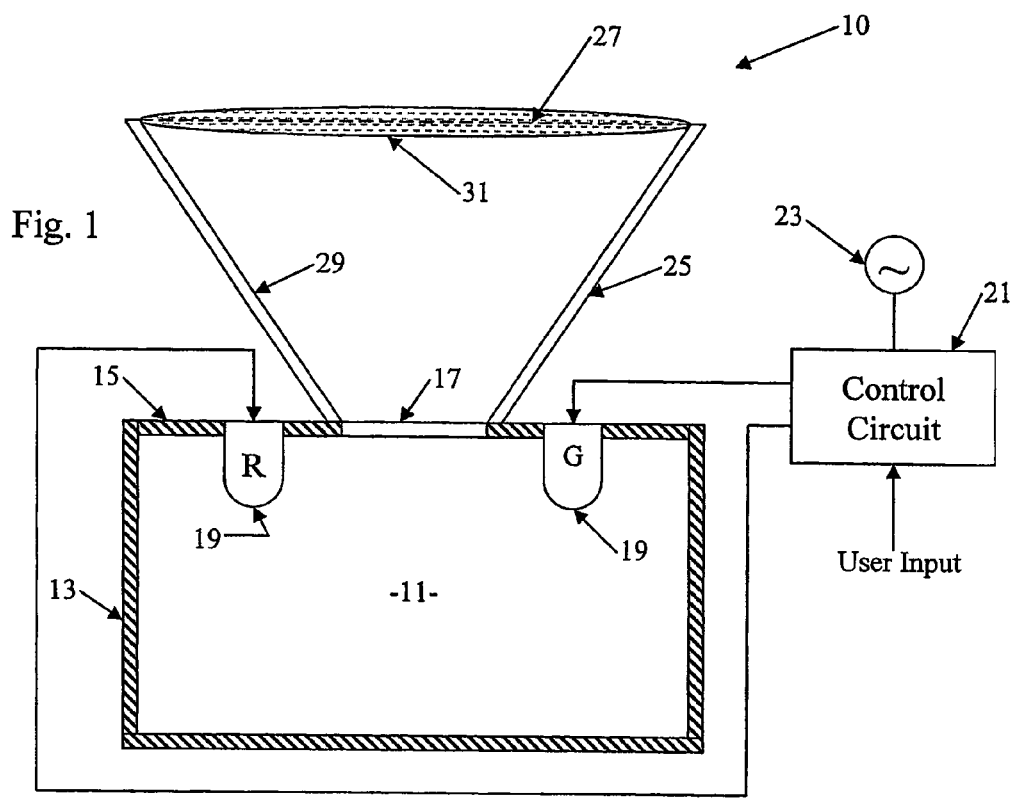
FIG. 1 illustrates an example of a luminous application lighting system, with certain elements thereof shown in cross-section.

Reference now is made in detail to the examples illustrated in the accompanying drawings and discussed below. FIG. 1 is a cross-sectional illustration of a radiant energy distribution apparatus or system 10. For luminous lighting applications, such as signage and indicator lights, the apparatus emits light in the visible spectrum, although the system 10 may be used for lumination applications and/or with emissions in or extending into the infrared and/or ultraviolet portions of the radiant energy spectrum. Most of the disclosed examples are configured for luminous lighting applications. However, those skilled in the art will recognize that several of the systems discussed below that utilize extruded elements also may be adapted for task lighting or object/product lighting applications.

Figure 2:
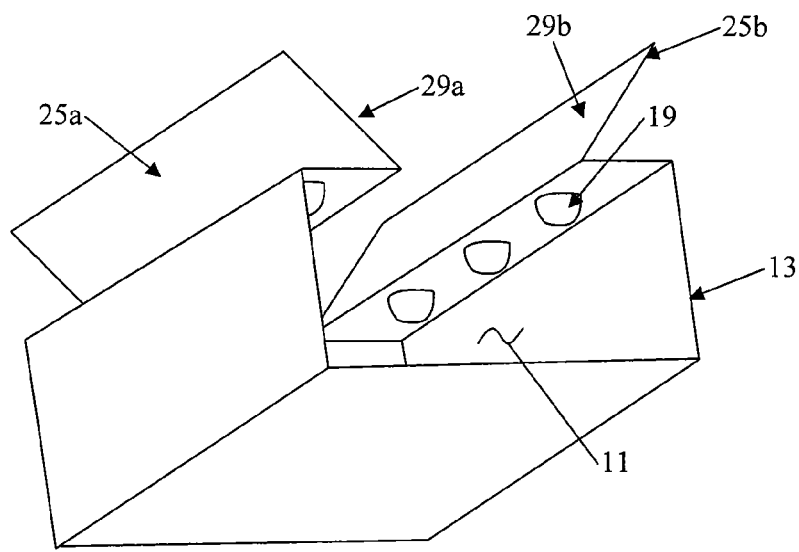
FIG. 2 is an isometric view of an extruded body member, of a fixture having the cross-section of FIG. 1.
Figure 3:
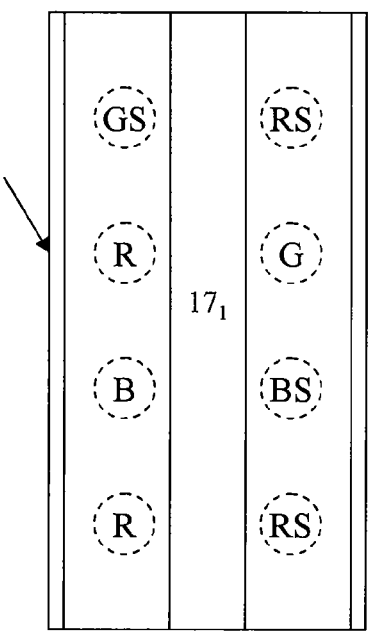
FIG. 3 is a front view of a fixture for use in a luminous application, for example to represent the letter "I."
Figure 4:
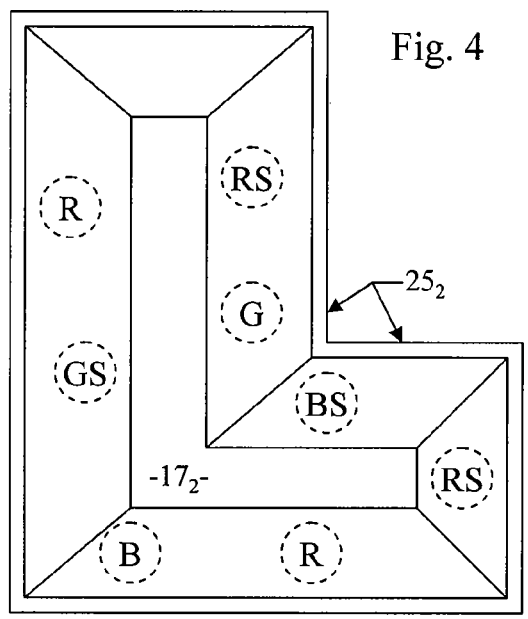
FIG. 4 is a front view of a fixture for use in a luminous application, representing the letter "L."

The illustrated system 10 includes an optical cavity 11 having a diffusely reflective interior surface, to receive and combine radiant energy of different colors/wavelengths. The cavity 11 may have various shapes. For example, the cavity may be hemispherical or semi-cylindrical. In this fixture 10, the cavity 11 has a substantially rectangular cross-section. FIG. 2 is an isometric view of a portion of a fixture having the cross-section of FIG. 1, showing several of the components formed as a single extrusion of the desired cross section. FIGS. 3 and 4 then show use of such a fixture arranged so as to construct lighted letters. The optical cavity 11 in many of the examples discussed below, e.g. in the examples of FIGS. 1-4, is typically an optical integrating cavity having an extended volume with a rectangular cross-section.

The disclosed apparatus may use a variety of different structures or arrangements for the optical integrating cavity, however, the illustrated examples utilize an extruded body member having reflective surfaces at appropriate locations. At least a substantial portion of the interior surface(s) of the cavity 11 exhibit(s) diffuse reflectivity. It is desirable that the cavity surface have a highly efficient reflective characteristic, e.g. a reflectivity equal to or greater than 90%, with respect to the relevant wavelengths. In the example of FIG. 1, the surface is highly diffusely reflective to energy in the visible, near-infrared, and ultraviolet wavelengths.

The cavity 11 may be formed of a diffusely reflective plastic material extruded in the desired shape. One example of suitable plastic is a polypropylene having a 97% reflectivity and a diffuse reflective characteristic. Such a highly reflective polypropylene is available from Ferro Corporation—Specialty Plastics Group, Filled and Reinforced Plastics Division, in Evansville, Ind. Another example of a plastic material with a suitable reflectivity is SPECTRALON. Alternatively, the optical integrating cavity may comprise a rigid extruded substrate having an interior surface, and a diffusely reflective coating layer formed on the interior surface of the substrate so as to provide the diffusely reflective interior surface of the optical integrating cavity. The coating layer, for example, might take the form of a flat-white paint or white powder coat. A suitable paint might include a zinc-oxide based pigment, consisting essentially of an uncalcined zinc oxide and preferably containing a small amount of a dispersing agent. The pigment is mixed with an alkali metal silicate vehicle-binder, which preferably is a potassium silicate, to form the coating material. For more information regarding the exemplary paint, attention is directed to U.S. patent application Ser. No. 09/866,516, which was filed May 29, 2001, by Matthew Brown, which issued as U.S. Pat. No. 6,700,112 on Mar. 2, 2004.

For purposes of the discussion, assume that the fixture includes an extruded body. A rectangular section 13 of the body has a diffusely reflective interior surface forming the cavity 11. The extruded member may be formed of a diffusely reflective plastic, or the member may be extruded of plastic or other materials and have a diffusely reflective coating or paint on the interior surface forming the cavity 11. As a result, the cavity 11 is an integrating type optical cavity.

The rectangular section 13 includes a wall 15. The wall 15 has an aperture 17 for allowing emission of combined radiant energy. In the example, the aperture 17 is a passage through the approximate center of the wall 15, although the aperture may be at any other convenient location on the wall 15 or elsewhere on the rectangular section 13. Because of the diffuse reflectivity within the cavity 11, light within the cavity is integrated before passage out of the aperture 17. In the example of FIG. 1, the apparatus 10 is shown emitting the combined radiant energy upward through the aperture 17, for convenience. However, the apparatus 10 may be oriented in any desired direction to perform a desired application function, for example to provide visible luminance to persons in a particular direction or location with respect to the fixture. Also, the optical integrating cavity 11 may have more than one aperture 17, for example, oriented to allow emission of integrated light in two or more different directions or regions, e.g. as required to represent a particular character or symbol or a number of such symbols in a desired arrangement.

The apparatus 10 also includes sources of radiant energy of different wavelengths. In the first example, the sources are LEDs 19, two of which are visible in the illustrated cross-section. The LEDs 19 supply radiant energy into the interior of the optical integrating cavity 11. As shown, the points of emission into the interior of the optical integrating cavity are not directly visible through the aperture 17. At least two of the LEDs emit radiant energy of different wavelengths, e.g. Red (R) and Green (G). Additional LEDs of the same or different colors may be provided. The cavity 11 effectively integrates the energy of different wavelengths, so that the integrated or combined radiant energy emitted through the aperture 17 includes the light of all the various wavelengths in relative amounts substantially corresponding to the relative intensities of input into the cavity 11.

The source LEDs 19 can include LEDs of any color or wavelength. Typically, an array of LEDs for a visible light application includes at least red, green, and blue LEDs. The integrating or mixing capability of the cavity 11 serves to project light of any color, including white light, by adjusting the intensity of the various sources coupled to the cavity. Hence, it is possible to control color rendering index (CRI), as well as color temperature. The system 10 works with the totality of light output from a family of LEDs 19. However, to provide color adjustment or variability, it is not necessary to control the output of individual LEDs, except as they contribute to the totality. For example, it is not necessary to modulate the LED outputs. Also, the distribution pattern of the individual LEDs and their emission points into the cavity are not significant. The LEDs 19 can be arranged in any manner to supply radiant energy within the cavity, although it is preferred that direct view of the LEDs from outside the fixture is minimized or avoided.

In this example, light outputs of the LED sources 19 are coupled directly to openings at points on the interior of the cavity 11, to emit radiant energy directly into the interior of the optical integrating cavity. The LEDs may be located to emit light at points on the interior wall of the rectangular section 13, although preferably such points would still be in regions out of the direct line of sight through the aperture 17. For ease of construction, however, the openings for the LEDs 19 are formed through the wall 15. On the wall 15, the openings/LEDs may be at any convenient locations.

The apparatus 10 also includes a control circuit 21 coupled to the LEDs 19 for establishing output intensity of radiant energy of each of the LED sources. The control circuit 21 typically includes a power supply circuit coupled to a source, shown as an AC power source 23. The control circuit 21 also includes an appropriate number of LED driver circuits for controlling the power applied to each of the individual LEDs 19 and thus the intensity of radiant energy supplied to the cavity 11 for each different wavelength. Control of the intensity of emission of the sources sets a spectral characteristic of the combined radiant energy emitted through the aperture 17 of the optical integrating cavity. The control circuit 21 may be responsive to a number of different control input signals, for example, to one or more user inputs as shown by the arrow in FIG. 1. Although not visible in this illustration, feedback may also be provided. Specific examples of the control circuitry are discussed in more detail later.

The aperture 17 may serve as the system output, directing integrated color light to a desired area or region. Although not shown in this example, the aperture 17 may have a grate, lens or diffuser (e.g. a holographic element) to help distribute the output light and/or to close the aperture against entry of moisture of debris. The aperture 17 may have any shape desired to facilitate a particular luminance application and provide light passage for transmission of reflected and integrated light outward from the cavity 11.

For luminous applications, the system 10 includes a reflective deflector 25 to further process and direct the light emitted from the aperture 17 of the optical integrating cavity 11. The deflector 25 has a reflective interior surface 29. When viewed in cross-section, the reflective portion of the deflector expands outward laterally from the aperture 17, as it extends away from the cavity 11 toward the region to be illuminated. In a circular implementation, the deflector 25 would be conical, e.g. to represent a period or dot. However, in the example of FIG. 2, the deflector is formed by two opposing panels 25a and 25b of the extruded body. The inner surfaces 29a and 29b of the panels are reflective. All or portions of the deflector surfaces may be diffusely reflective, quasi-specular or specular. For some examples, it may be desirable to have one panel surface 29a diffusely reflective and have specular reflectivity on the other panel surface 29b.

As shown in FIG. 1, a small opening at a proximal end of the deflector 25 is coupled to the aperture 17 of the optical integrating cavity 11. The deflector 25 has a larger opening 27 at a distal end thereof. The angle of the interior surface 29 and size of the distal opening 27 of the deflector 25 define an angular field of radiant energy emission from the apparatus 10. The large opening of the deflector 25 may be covered with a grating, a plate or the exemplary lens 31 (which is omitted from FIG. 2, for convenience). The lens 31 may be clear or translucent to provide a diffuse transmissive processing of the light passing out of the large opening. Prismatic materials, such as a sheet of microprism plastic or glass also may be used.

The overall shape of the fixture in system 10 may be chosen to provide a desired luminous shape, for example, in the shape of any selected number, character, letter, or other symbol. FIG. 3, for example, shows a view of such a fixture, as if looking back from the area receiving the light, with the lens removed from the output opening of the deflector 25. In this example, the aperture $17_1$ and the output opening of the deflector 25₁ are both rectangular, although they may have somewhat rounded corners. Alternatively, the deflector may be somewhat oval in shape. To the observer, the fixture will appear as a tall rectangular light. If the long dimension of the rectangular shape is extended or, elongated sufficiently, the lighted fixture might appear as a lighted letter I. The shapes of the cavity and the aperture may vary, for example, to have rounded ends, and the deflector may be contoured to match the aperture, for example, to provide softer or sharper edges and/or to create a desired font style for the letter.

FIG. 4 shows a view of another example of such a fixture, again as if looking back from the area receiving the light with the lens removed from the output opening of the deflector 25. In this example, the aperture $17_2$ and the output opening of the deflector $25_2$ are both L-shaped. When lighted, the observer will perceive the fixture as a lighted letter L. Of course, the shapes of the aperture and deflector openings may vary somewhat, for example, by using curves or rounded corners, so the letter approximates the shape for a different type font.

The extruded body construction illustrated in FIG. 2 may be curved or bent for use in different letters or numbers or other characters/symbols. By combining several versions of the fixture 10, shaped to represent different letters or numbers, it becomes possible to spell out any desired word or phrase. Control of the amplitudes of the drive currents applied to the LEDs 19 of each fixture controls the amount of each light color supplied into the respective optical integrating cavity and thus the combined light output color of each number, character, letter, or other symbol of the word or phrase.

In some examples, at least a substantial portion of the reflective interior surface 29 of the deflector 25 exhibits specular reflectivity with respect to the integrated radiant energy. As discussed in U.S. Pat. No. 6,007,225, for some applications, it may be desirable to construct the deflector 25 so that at least some portion(s) of the inner surface 29 exhibit diffuse reflectivity or exhibit a different degree of specular reflectivity (e.g., quasi-secular), so as to tailor the performance of the deflector 25 to the particular application. For other applications, it may also be desirable for the entire interior surface 29 of the deflector 25 to have a diffuse reflective characteristic.

In the illustrated example, the large distal opening 27 of the deflector 25 is roughly the same size as the cavity 11. In some applications, this size relationship may be convenient for construction purposes. However, a direct relationship in size of the distal end of the deflector and the cavity is not required. The large end of the deflector may be larger or smaller than the cavity structure. As a practical matter, the size of the cavity is optimized to provide the integration or combination of light colors from the desired number of LED sources 19. The size, angle and shape of the deflector 25 determine the area that will receive the luminous radiation from the combined or integrated light emitted from the cavity 11 emitted via the aperture 17.

In the examples, each source of radiant energy of a particular wavelength comprises one or more light emitting diodes (LEDs). Within the chamber, it is possible to process light received from any desirable number of such LEDs. Hence, in several examples, the sources may comprise one or more LEDs for emitting light of a first color, and one or more LEDs for emitting light of a second color, wherein the second color is different from the first color. In a similar fashion, the apparatus may include additional sources comprising one or more LEDs of a third color, a fourth color, etc.

To achieve the highest color rendering index (CRI), the LED array may include LEDs of various wavelengths that cover virtually the entire visible spectrum. Examples with additional sources of substantially white light are discussed later.

FIGS. 3 and 4 also depict use of initially inactive or "sleeper" LEDs. In these examples, the array of LEDs 19 includes initially active LEDs for providing red (R), green (G) and blue (B) light. Specifically, there are two red (R) LEDs, one green (G) LED and one blue (B) LED. The array of LEDs 19 in these examples also includes sleeper LEDs of each type. In the examples, the sleeper LEDs might include one Red sleeper (RS) LED, one Green sleeper (GS) LED and one Blue sleeper (BS) LED.

The control circuit 21 controls the power provided to each of the LEDs 19. The cavity 11 effectively integrates the energy of different wavelengths, from the various LEDs 19, so that the integrated light energy emitted through the apertures 17 and 27 includes the radiant energy of all the various wavelengths. Control of the intensity of emission of the sources, by the control circuit 21, sets a spectral characteristic of the combined radiant energy emitted through the aperture 35. The control also activates one or more dormant LEDs, on an "as-needed" basis, when extra output of a particular wavelength or color is required in order to maintain the light output, color, color temperature, and/or thermal temperature. As discussed later with regard to an exemplary control circuit, the system 10 could have a color sensor coupled to provide feedback to the control circuit 21. The sensor could be within the cavity or the deflector or at an outside point illuminated by the integrated light from the fixture. The control may also be responsive to other sensors, such as a temperature sensor and/or an overall intensity sensor.

As LEDs age, they continue to operate, but at a reduced output level. The use of the sleeper LEDs greatly extends the lifecycle of the fixtures. Activating a sleeper (previously inactive) LED, for example, provides compensation for the decrease in output of the originally active LED. There is also more flexibility in the range of intensities that the fixtures may provide.

In the examples discussed above relative to FIG. 1 to 4, the LED sources were coupled directly to openings at the points on the interior of the cavity, to emit radiant energy directly into the interior of the optical integrating cavity. It is also envisioned that the sources may be somewhat separated from the cavity, in which case, the device might include optical fibers or other forms of light guides coupled between the sources and the optical integrating cavity, to supply radiant energy from the sources to the emission points into the interior of the cavity.

The disclosed devices have numerous applications, and the output intensity and spectral characteristic may be tailored and/or adjusted to suit the particular application. For example, the intensity of the integrated radiant energy emitted through the aperture may be at a level for use in a lumination application or at a level sufficient for a task lighting application. Illumination of a specific object or person also is possible. A number of other control circuit features also may be implemented. For example, the control may maintain a set color characteristic in response to feedback from a color sensor. The control circuitry may also include a temperature sensor. In such an example, the logic circuitry is also responsive to the sensed temperature, e.g. to reduce intensity of the source outputs to compensate for temperature increases. The control circuitry may include an appropriate device for manually setting the desired spectral characteristic, for example, one or more variable resistors or one or more dip switches, to allow a user to define or select the desired color distribution.

Automatic controls also are envisioned. For example, the control circuitry may include a data interface coupled to the logic circuitry, for receiving data defining the desired color distribution. Such an interface would allow input of control data from a separate or even remote device, such as a personal computer, personal digital assistant or the like. A number of the devices, with such data interfaces, may be controlled from a common central location or device.

The control may be somewhat static, e.g. set the desired color reference index or desired color temperature and the overall intensity, and leave the device set-up in that manner for an indefinite period. Also, light settings are easily recorded and reused at a later time or even at a different location using a different system.

To appreciate the features and examples of the control circuitry outlined above, it may be helpful to consider specific examples with reference to appropriate diagrams.

Figure 5:
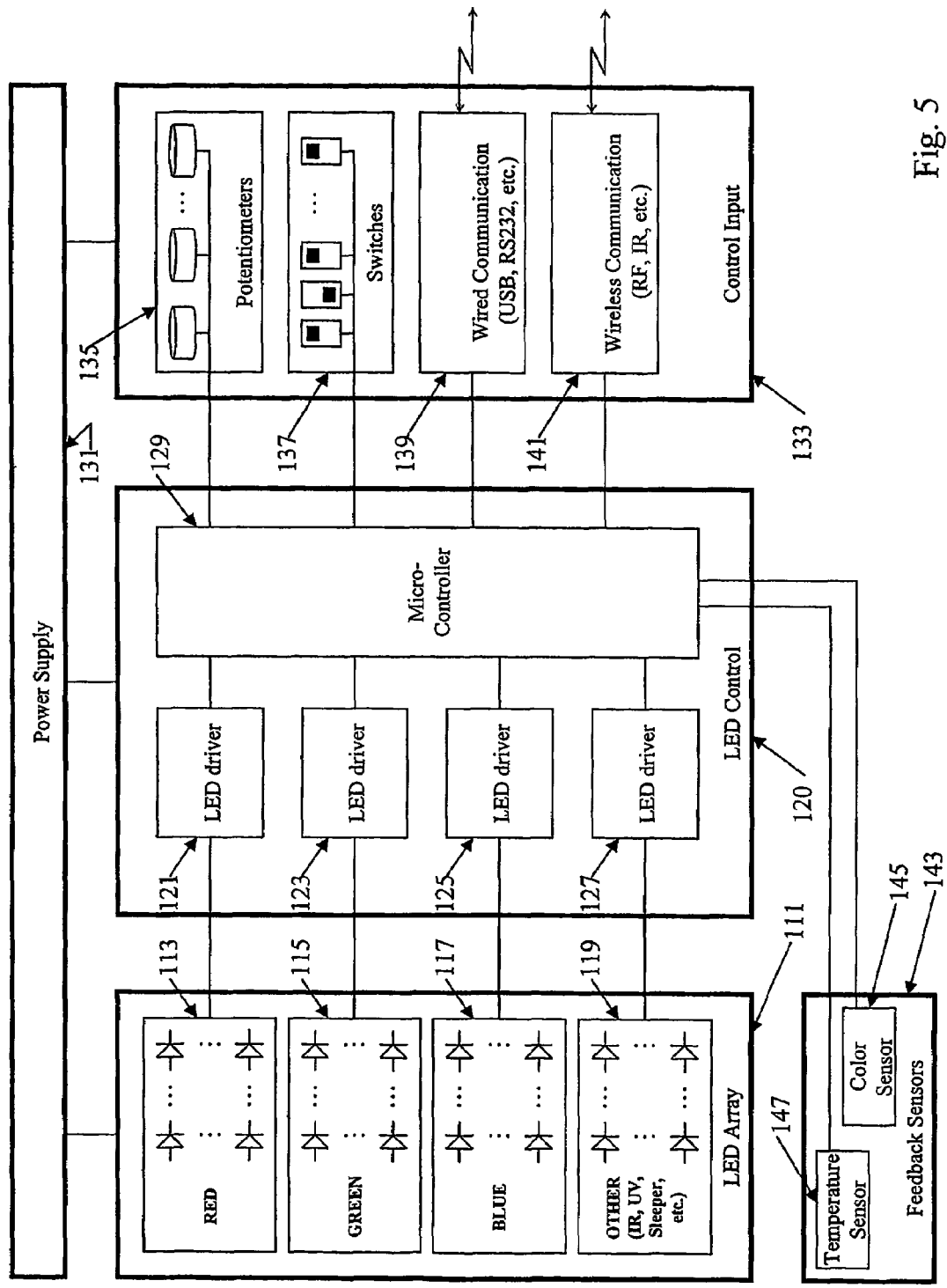
FIG. 5 is a functional block diagram of the electrical components, of one of the light emitting systems, using programmable digital control logic.

FIG. 5 is a block diagram of exemplary circuitry for the sources and associated control circuit, providing digital programmable control, which may be utilized with a light integrating fixture of the type described above. In this circuit example, the sources of radiant energy of the various types takes the form of an LED array 111. The array 111 comprises two or more LEDs of each of the three primary colors, red green and blue, represented by LED blocks 113, 115 and 117. For example, the array may comprise six red LEDs 113, three green LEDs 115 and three blue LEDs 117.

The LED array in this example also includes a number of additional or "other" LEDs 119. There are several types of additional LEDs that are of particular interest in the present discussion. One type of additional LED provides one or more additional wavelengths of radiant energy for integration within the chamber. The additional wavelengths may be in the visible portion of the light spectrum, to allow a greater degree of color adjustment. Alternatively, the additional wavelength LEDs may provide energy in one or more wavelengths outside the visible spectrum, for example, in the infrared range or the ultraviolet range.

The second type of additional LED that may be included in the system is a sleeper LED. As discussed above, some LEDs would be active, whereas the sleepers would be inactive, at least during initial operation. Using the circuitry of FIG. 5 as an example, the Red LEDs 113, Green LEDs 115 and Blue LEDs 117 might normally be active. The LEDs 119 would be sleeper LEDs, typically including one or more LEDs of each color used in the particular system.

The third type of other LED of interest is a white LED. For white luminous applications, one or more white LEDs provide increased intensity. The primary color LEDs then provide light for color adjustment and/or correction.

The electrical components shown in FIG. 5 also include an LED control system 120. The system 120 includes driver circuits for the various LEDs and a microcontroller. The driver circuits supply electrical current to the respective LEDs 113 to 119 to cause the LEDs to emit light. The driver circuit 121 drives the Red LEDs 113, the driver circuit 123 drives the green LEDs 115, and the driver circuit 125 drives the Blue LEDs 117. In a similar fashion, when active, the driver circuit 127 provides electrical current to the other LEDs 119. If the other LEDs provide another color of light, and are connected in series, there may be a single driver circuit 127. If the LEDs are sleepers, it may be desirable to provide a separate driver circuit 127 for each of the LEDs 119. The intensity of the emitted light of a given LED is proportional to the level of current supplied by the respective driver circuit.

The current output of each driver circuit is controlled by the higher level logic of the system. In this digital control example, that logic is implemented by a programmable microcontroller 129, although those skilled in the art will recognize that the logic could take other forms, such as discrete logic components, an application specific integrated circuit (ASIC), etc.

The LED driver circuits and the microcontroller 129 receive power from a power supply 131, which is connected to an appropriate power source (not separately shown). For most task-lighting applications, the power source will be an AC line current source, however, some applications may utilize DC power from a battery or the like. The power supply 129 converts the voltage and current from the source to the levels needed by the driver circuits 121-127 and the microcontroller 129.

A programmable microcontroller typically includes or has coupled thereto random-access memory (RAM) for storing data and read-only memory (ROM) and/or electrically erasable read only memory (EEROM) for storing control programming and any pre-defined operational parameters, such as pre-established light 'recipes.' The microcontroller 129 itself comprises registers and other components for implementing a central processing unit (CPU) and possibly an associated arithmetic logic unit. The CPU implements the program to process data in the desired manner and thereby generate desired control outputs.

The microcontroller 129 is programmed to control the LED driver circuits 121-127 to set the individual output intensities of the LEDs to desired levels, so that the combined light emitted from the aperture of the cavity has a desired spectral characteristic and a desired overall intensity. The microcontroller 129 may be programmed to essentially establish and maintain or preset a desired 'recipe' or mixture of the available wavelengths provided by the LEDs used in the particular system. The microcontroller 129 receives control inputs specifying the particular 'recipe' or mixture, as will be discussed below. To insure that the desired mixture is maintained, the microcontroller receives a color feedback signal from an appropriate color sensor. The microcontroller may also be responsive to a feedback signal from a temperature sensor, for example, in or near the optical integrating cavity.

The electrical system will also include one or more control inputs 133 for inputting information instructing the microcontroller 129 as to the desired operational settings. A number of different types of inputs may be used and several alternatives are illustrated for convenience. A given installation may include a selected one or more of the illustrated control input mechanisms.

As one example, user inputs may take the form of a number of potentiometers 135. The number would typically correspond to the number of different light wavelengths provided by the particular LED array 111. The potentiometers 135 typically connect through one or more analog to digital conversion interfaces provided by the microcontroller 129 (or in associated circuitry). To set the parameters for the integrated light output, the user adjusts the potentiometers 135 to set the intensity for each color. The microcontroller 129 senses the input settings and controls the LED driver circuits accordingly, to set corresponding intensity levels for the LEDs providing the light of the various wavelengths.

Another user input implementation might utilize one or more dip switches 137. For example, there might be a series of such switches to input a code corresponding to one of a number of recipes. The memory used by the microcontroller 129 would store the necessary intensity levels for the different color LEDs in the array 111 for each recipe. Based on the input code, the microcontroller 129 retrieves the appropriate recipe from memory. Then, the microcontroller 129 controls the LED driver circuits 121-127 accordingly, to set corresponding intensity levels for the LEDs 113-119 providing the light of the various wavelengths.

As an alternative or in addition to the user input in the form of potentiometers 135 or dip switches 137, the microcontroller 129 may be responsive to control data supplied from a separate source or a remote source. For that purpose, some versions of the system will include one or more communication interfaces. One example of a general class of such interfaces is a wired interface 139. One type of wired interface typically enables communications to and/or from a personal computer or the like, typically within the premises in which the fixture operates. Examples of such local wired interfaces include USB, RS-232, and wire-type local area network (LAN) interfaces. Other wired interfaces, such as appropriate modems, might enable cable or telephone line communications with a remote computer, typically outside the premises. Other examples of data interfaces provide wireless communications, as represented by the interface 141 in the drawing. Wireless interfaces, for example, use radio frequency (RF) or infrared (IR) links. The wireless communications may be local on-premises communications, analogous to a wireless local area network (WLAN). Alternatively, the wireless communications may enable communication with a remote device outside the premises, using wireless links to a wide area network.

As noted above, the electrical components may also include one or more feedback sensors 143, to provide system performance measurements as feedback signals to the control logic, implemented in this example by the microcontroller 129. A variety of different sensors may be used, alone or in combination, for different applications. In the illustrated examples, the set 143 of feedback sensors includes a color sensor 145 and a temperature sensor 147. Although not shown, other sensors, such as an overall intensity sensor, may be used. The sensors are positioned in or around the system to measure the appropriate physical condition, e.g. temperature, color, intensity, etc.

The color sensor 145, for example, is coupled to detect color distribution in the integrated radiant energy. The color sensor may be coupled to sense energy within the optical integrating cavity 11, within the deflector 25 or at a point in the field illuminated by the particular system 10. However, in many cases, the wall 15 or another part of the rectangular section 13 may pass some of the integrated light from the cavity 11, in which case, it is actually sufficient to place the color light sensor(s) 145 adjacent any such partially transmissive point on the outer wall that forms the cavity.

Various examples of appropriate color sensors are known. For example, the color sensor may be a digital compatible sensor, of the type sold by TAOS, Inc. Another suitable sensor might use the quadrant light detector disclosed in U.S. Pat. No. 5,877,490, with appropriate color separation on the various light detector elements (see U.S. Pat. No. 5,914,487 for discussion of the color analysis).

The associated logic circuitry, responsive to the detected color distribution, controls the output intensity of the various LEDs, so as to provide a desired color distribution in the integrated radiant energy, in accord with appropriate settings. In an example using sleeper LEDs, the logic circuitry is responsive to the detected color distribution to selectively activate the inactive light emitting diodes as needed, to maintain the desired color distribution in the integrated radiant energy. The color sensor measures the color of the integrated radiant energy produced by the system and provides a color measurement signal to the microcontroller 129. If using the TAOS, Inc. color sensor, for example, the signal is a digital signal derived from a color to frequency conversion.

The temperature sensor 147 may be a simple thermoelectric transducer with an associated analog to digital converter, or a variety of other temperature detectors may be used. The temperature sensor is positioned on or inside of the fixture, typically at a point that is near the LEDs or other sources that produce most of the system heat. The temperature sensor 147 provides a signal representing the measured temperature to the microcontroller 129. The system logic, here implemented by the microcontroller 129, can adjust intensity of one or more of the LEDs in response to the sensed temperature, e.g. to reduce intensity of the source outputs to compensate for temperature increases. The program of the microcontroller 129, however, would typically manipulate the intensities of the various LEDs so as to maintain the desired color balance between the various wavelengths of light used in the system, even though it may vary the overall intensity with temperature. For example, if temperature is increasing due to increased drive current to the active LEDs (with increased age or heat), the controller may deactivate one or more of those LEDs and activate a corresponding number of the sleepers, since the newly activated sleeper(s) will provide similar output in response to lower current and thus produce less heat.

Figure 6:
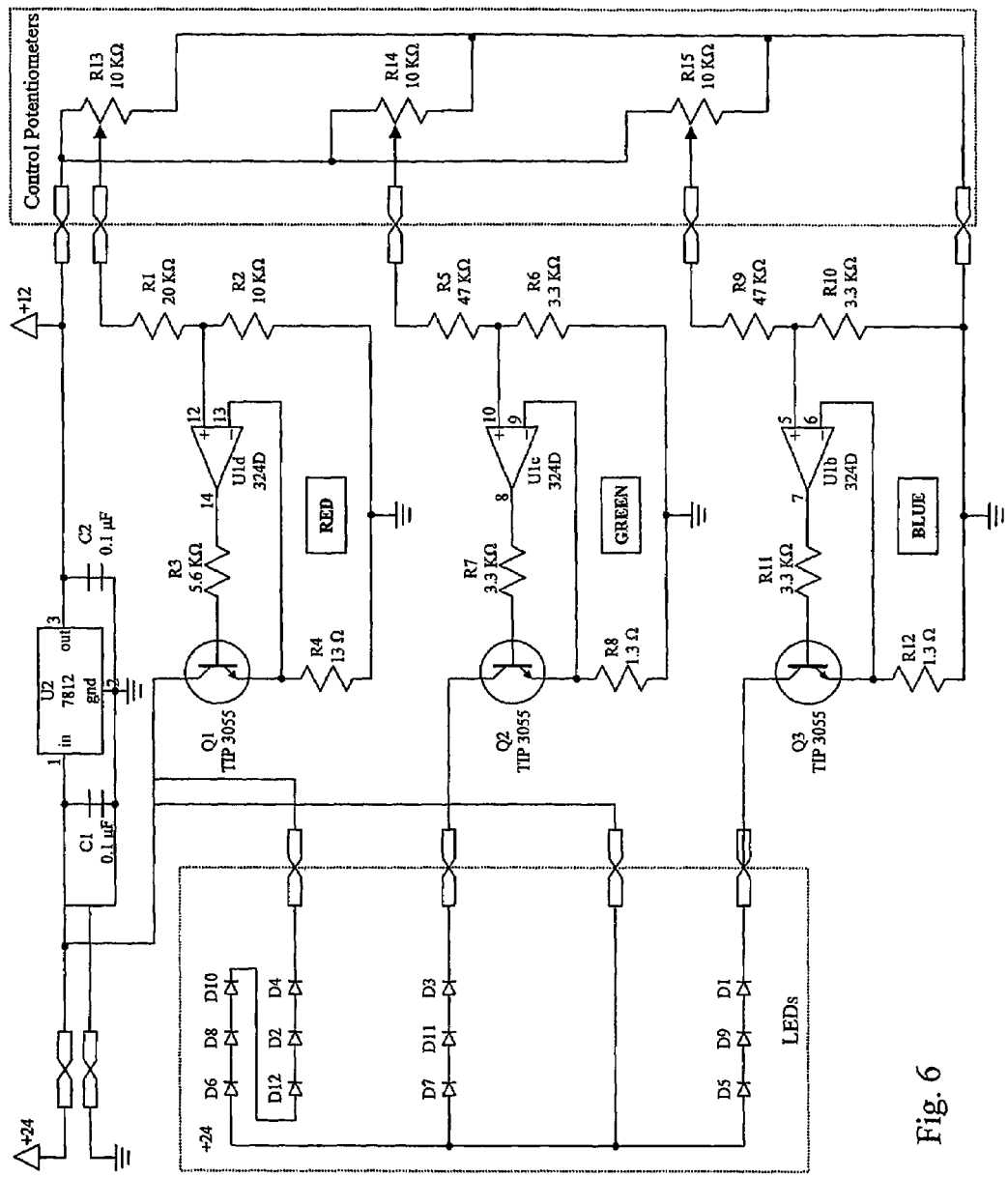
FIG. 6 is a circuit diagram showing the electrical components, of one of the light emitting systems, using analog control circuitry.

The above discussion of FIG. 5 related to programmed digital implementations of the control logic. Those skilled in the art will recognize that the control also may be implemented using analog circuitry. FIG. 6 is a circuit diagram of a simple analog control for a lighting apparatus (e.g. of the type shown in FIG. 1) using Red, Green and Blue LEDs. The user establishes the levels of intensity for each type of radiant energy emission (Red, Green or Blue) by operating a corresponding one of the potentiometers. The circuitry essentially comprises driver circuits for supplying adjustable power to two or three sets of LEDs (Red, Green and Blue) and analog logic circuitry for adjusting the output of each driver circuit in accord with the setting of a corresponding potentiometer. Additional potentiometers and associated circuits would be provided for additional colors of LEDs. Those skilled in the art should be able to implement the illustrated analog driver and control logic of FIG. 6 without further discussion.

Figure 7:
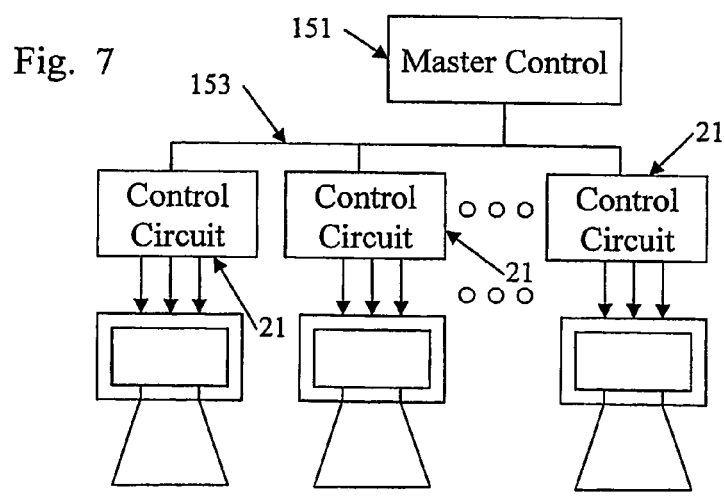
FIG. 7 is a diagram, illustrating a number of light emitting systems with common control from a master control unit.

The systems described above have a wide range of luminous applications, where there is a desire to set or adjust color provided by a lighting fixture. Some lighting applications involve a common overall control strategy for a number of the systems. As noted in the discussion of FIG. 5, the control circuitry may include a communication interface 139 or 141 allowing the microcontroller 129 to communicate with another processing system. FIG. 7 illustrates an example in which control circuits 21 of a number of the radiant energy generation systems with the light integrating and distribution type fixture communicate with a master control unit 151 via a communication network 153. The master control unit 151 typically is a programmable computer with an appropriate user interface, such as a personal computer or the like. The communication network 153 may be a LAN or a wide area network, of any desired type. The communications allow an operator to control the color and output intensity of all of the linked systems, for example to provide combined lighting effects from a number of fixtures that together spell our a word or phrase.

In the examples above, a deflector and a lens were used to provide further optical processing of the integrated light emerging from the aperture 17 of the fixture. A variety of other optical processing devices may be used in place of or in combination with those optical processing elements. Examples include various types of diffusers, collimators, variable focus mechanisms, and iris or aperture size control mechanisms.

Figure 8:
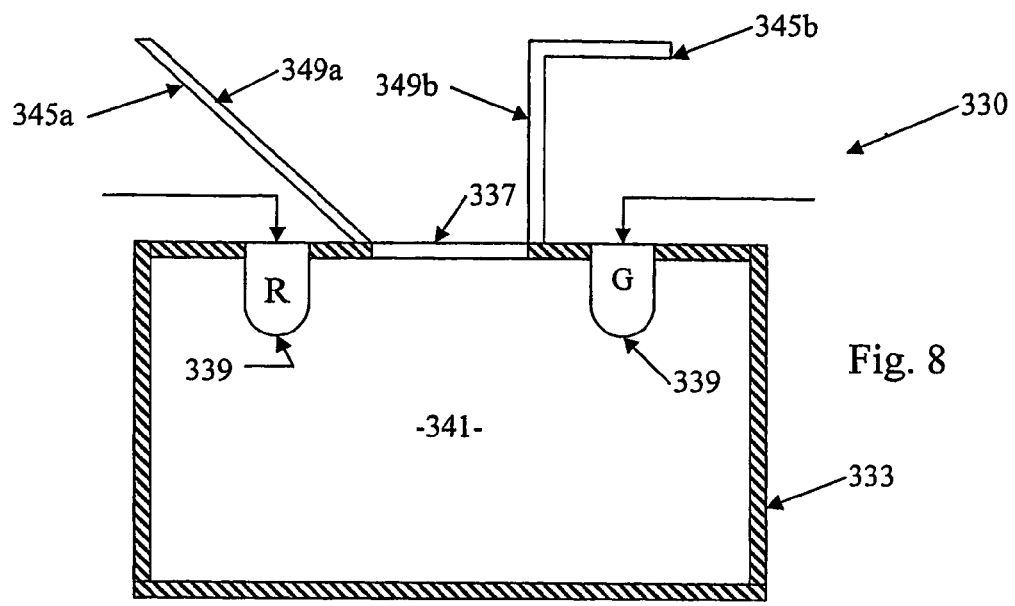
FIG. 8 is a cross-sectional view of another example of an optical cavity LED light fixture.
Figure 9:
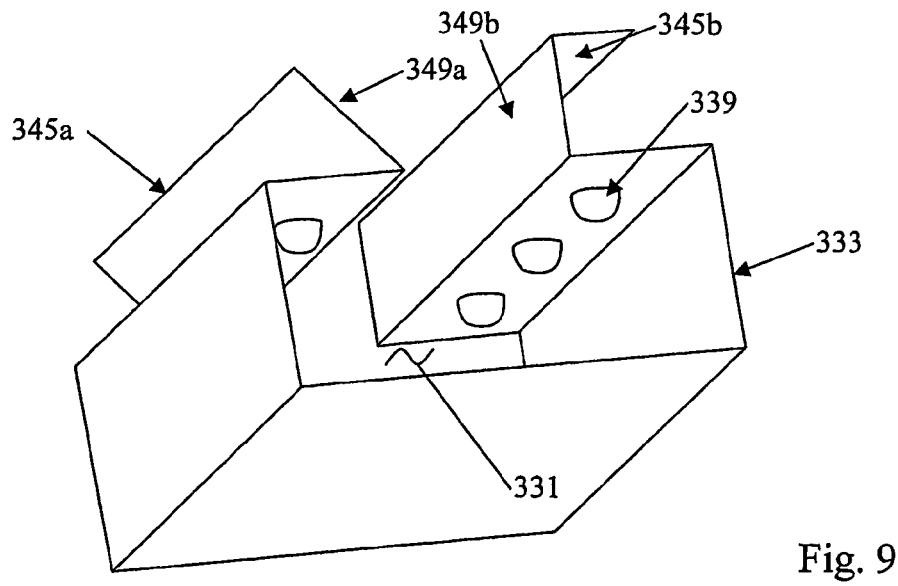
FIG. 9 is an isometric view of an extruded section of a fixture having the cross-section of FIG. 8.

FIGS. 8 and 9 show another extruded type lighting fixture, but here adapted for a somewhat directed light throw. The fixture 330 includes an optical integrating cavity 331 having a diffusely reflective inner surface, as in the earlier examples. In this fixture, the cavity 331 again has a substantially rectangular cross-section. FIG. 9 is an isometric view of a section of an extruded body member forming a portion of the fixture. The isometric view, for example, shows several of the components, particularly the rectangular section 333 and the deflector, formed as a single extrusion of the desired cross section, but without any end-caps.

As shown in these figures, the fixture 330 includes several initially-active LEDs and several sleeper LEDs, generally shown at 339, similar to those in the earlier examples. The LEDs emit controlled amounts of multiple colors of light into the optical integrating cavity 341 formed by the inner surfaces of a rectangular member 333. A power source and control circuit similar to those used in the earlier examples provide the drive currents for the LEDs 339, and in view of the similarity, the power source and control circuit are omitted from FIG. 8, to simplify the illustration. One or more apertures 337, of the shape desired to facilitate the particular lighting application, provide light passage for transmission of reflected and integrated light outward from the cavity 341.

The fixture 330 in this example (FIG. 8) includes a deflector to further process and direct the light emitted from the aperture 337 of the optical integrating cavity 341, in this can somewhat to the left of and above the fixture 330 in the orientation shown. The deflector is formed by two opposing panels 345a and 345b of the extruded body of the fixture. The panel 345a is relatively flat and angled somewhat to the left, in the illustrated orientation. Assuming a vertical orientation of the fixture as shown in FIG. 8, the panel 345b extends vertically upward from the edge of the aperture 337 and is bent back at about 90°. The shapes and angles of the panels 345a and 345b are chosen to direct the light to a particular area of a wall or product display that is to be illuminated, and may vary from application to application.

Each panel 345a, 345b has a reflective interior surface 349a, 349b. As in the earlier examples, all or portions of the deflector surfaces may be diffusely reflective, quasi-specular or specular. In the example, the deflector panel surface 349b is diffusely reflective, and the deflector panel surface 349a has a specular reflectivity, to optimize distribution of emitted light over the desired area illuminated by the fixture 330. The output opening of the deflector 345 may be covered with a grating, a plate or lens, in a manner similar to the example of FIG. 1, although in the illustrated example (FIGS. 8 and 9), such an element is omitted.

Materials for construction of the cavity and the deflector and the types of LEDs that may be used are similar to those discussed relative to the example of FIGS. 1 and 2, although the number and intensities of the LEDs may be different, to achieve the output parameters desired for a particular application. The extruded body construction illustrated in FIGS. 8 and 9 may be curved or bent for use in different letters or numbers or other characters/symbols, as discussed above relative to FIGS. 1-4.

Figure 10:
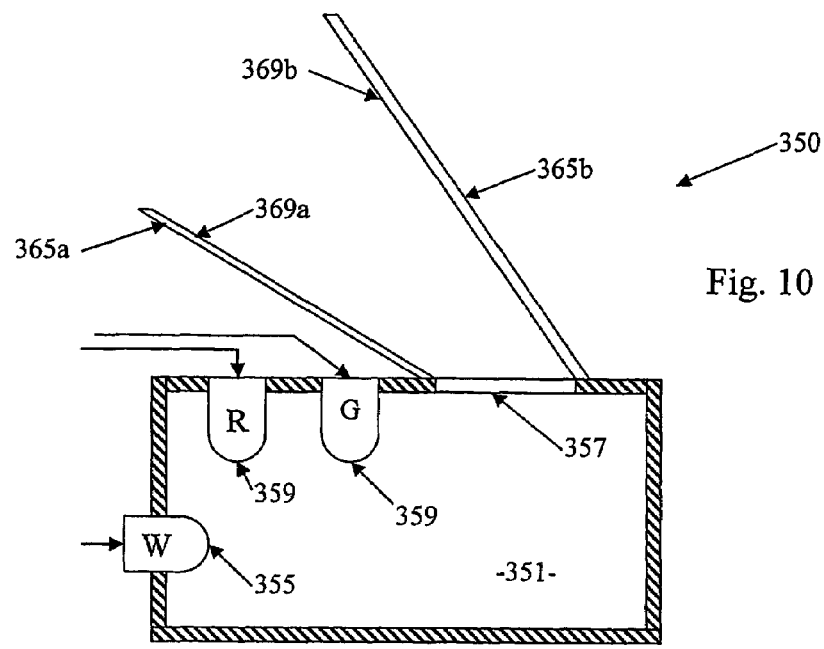
FIG. 10 is a cross-sectional view of another example of an optical cavity LED light fixture, using a combination of a white light source and a plurality of primary color light sources.

FIG. 10 is a cross sectional view of another example of an extruded construction of lighting fixture 350. The fixture 350 includes an optical integrating cavity 351 having a diffusely reflective inner surface, as in the earlier examples. In this fixture, the cavity 351 again has a substantially rectangular cross-section. As shown, the fixture 350 includes at least one white light source, represented by the white LED 355. The fixture also includes several LEDs 359 of the various primary colors, typically red (R), green (G) and blue (13, not visible in this cross-sectional view). The LEDs 359 include both initially-active LEDs and sleeper LEDs, and the LEDs 359 are similar to those in the earlier examples. Again, the LEDs emit controlled amounts of multiple colors of light into the optical integrating cavity 351 formed by the inner surfaces of a rectangular member 353. A power source and control circuit similar to those used in the earlier examples provide the drive currents for the LEDs 359, and in this example, that same circuit controls the drive current applied to the white LED 355. In view of the similarity, the power source and control circuit are omitted from FIG. 10, to simplify the illustration.

One or more apertures 357, of the shape desired to facilitate the particular lighting application, provide light passage for transmission of reflected and integrated light outward from the cavity 351. The aperture may be laterally centered, as in the earlier examples; however, in this example, the aperture is off-center to facilitate a light-throw to the left (in the illustrated orientation). Materials for construction of the cavity and the deflector and the types of LEDs that may be used are similar to those discussed relative to the earlier examples. Again, an extruded fixture of the illustrated cross section may be elongated, curved or bent, as desired to facilitate any desired application.

Here, it is assumed that the fixture 350 is intended to principally provide white light. The presence of the white light source 355 increases the intensity of white light that the fixture produces. The control of the outputs of the primary color LEDs 359 allows the operator to correct for any variations of the white light from the source 355 from normal white light and/or to adjust the color balance/temperature of the light output. For example, if the white light source 355 is an LED as shown, the white light it provides tends to be rather blue. The intensities of light output from the LEDs 359 can be adjusted to compensate for this blueness, for example, to provide a light output approximating sunlight or light from a common incandescent source, as or when desired.

The fixture 350 may have any desired output processing element(s), as discussed above with regard to various earlier examples. In the illustrated embodiment (FIG. 10), the fixture 350 includes a deflector to further process and direct the light emitted from the aperture 357 of the optical integrating cavity 351, in this case somewhat toward the left of and above the fixture 350. The deflector is formed by two opposing panels 365a and 365b having reflective inner surfaces 365a and 365b. Although other shapes may be used to direct the light output to the desired area or region, the illustration shows the panel 365a, 365b as relatively flat panels set at somewhat different angle extending to the left, in the illustrated orientation. Of course, as for all the examples, the fixture may be turned at any desired angle or orientation to direct the light to a particular region from which a person will observe its luminance or to an object or person to be illuminated by the fixture, in a given application.

As noted, each panel 365a, 365b has a reflective interior surface 369a, 369b. As in the earlier examples, all or portions of the deflector surfaces may be diffusely reflective, quasi-specular or specular. In the example, the deflector panel surface 369b is diffusely reflective, and the deflector panel surface 369a has a specular reflectivity, to optimize distribution of emitted light over the desired region intended to receive light from the fixture 350. The output opening of the deflector 365 may be covered with a grating, a plate or lens, in a manner similar to the example of FIG. 1, although in the illustrated example (FIG. 10), such an element is omitted.

The extruded body construction illustrated in FIG. 10 may be curved or bent for use in different letters or numbers or other characters/symbols, as discussed above relative to FIGS. 1-4.

Figure 11:
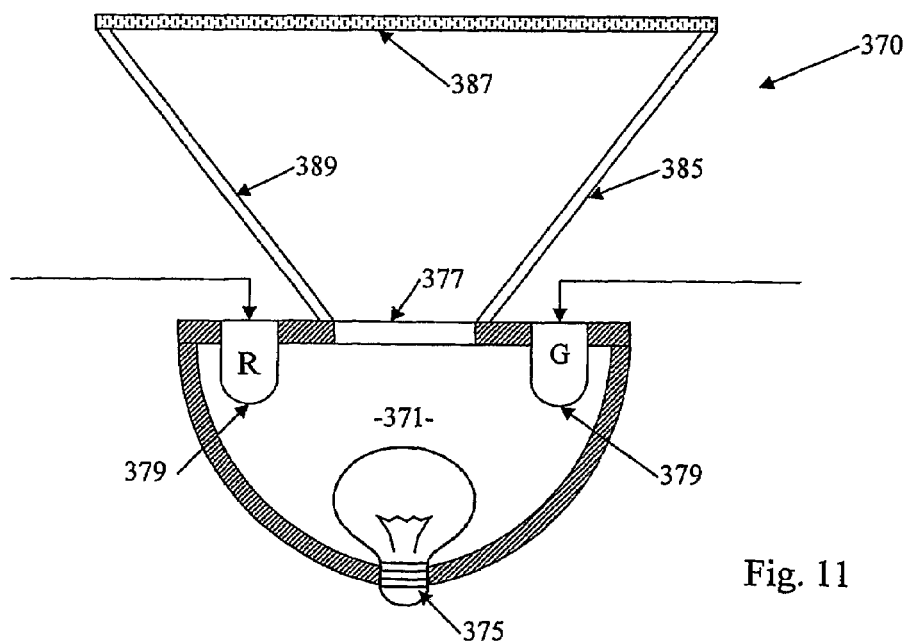
FIG. 11 is a cross-sectional view of another example of an optical cavity LED light fixture, in this case using a deflector and a combination of a white light source and a plurality of primary color light sources.

FIG. 11 is a cross-sectional view of another example of an optical integrating cavity type light fixture 370. This example uses a deflector and lens to optically process the light output, and like the example of FIG. 10 the fixture 370 includes LEDs to produce various colors of light in combination with a white light source. The fixture 370 includes an optical integrating cavity 371, having a semi-circular cross-section. The fixture may be approximately hemispherical, or the fixture 370 may be elongated. The extruded body construction illustrated in FIG. 11 may be curved or bent for use in different letters or numbers or other characters/symbols, as discussed above relative to FIGS. 1-4.

The surfaces of the extruded body forming the interior surface(s) of the cavity 371 are diffusely reflective. One or more apertures 377 provide a light passage for transmission of reflected and integrated light outward from the cavity 371. Materials, sizes, orientation, positions and possible shapes for the elements forming the cavity and the types/numbers of LEDs have been discussed above.

As shown, the fixture 370 includes at least one white light source. Although the white light source could comprise one or more LEDs, as in the previous example (FIG. 10), in this embodiment, the white light source comprises a lamp 375. The lamp may be any convenient form of light bulb, such as an incandescent or fluorescent light bulb; and there may be one, two or more bulbs to produce a desired amount of white light. A preferred example of the lamp 375 is a quartz halogen light bulb. The fixture also includes several LEDs 379 of the various primary colors, typically red (R), green (G) and blue (B, not visible in this cross-sectional view), although additional colors may be provided or other color LEDs may be substituted for the RGB LEDs. Some LEDs will be active from initial operation. Other LEDs may be held in reserve as sleepers. The LEDs 379 are similar to those in the earlier examples, for emitting controlled amounts of multiple colors of light into the optical integrating cavity 371.

A power source and control circuit similar to those used in the earlier examples provide the drive currents for the LEDs 359. In view of the similarity, the power source and control circuit for the LEDs are omitted from FIG. 11, to simplify the illustration. The lamp 375 may be controlled by the same or similar circuitry, or the lamp may have a fixed power source.

The white light source 375 may be positioned at a point that is not directly visible through the aperture 377 similar to the positions of the LEDs 379. However, for applications requiring relatively high white light output intensity, it may be preferable to position the white light source 375 to emit a substantial portion of its light output directly through the aperture 377.

The fixture 370 may incorporate any of the further optical processing elements discussed above. In the illustrated version, however, the fixture 370 includes a deflector 385 to further process and direct the light emitted from the aperture 377 of the optical integrating cavity 371. The deflector 385 has a reflective interior surface 389 and expands outward laterally from the aperture, as it extends away from the cavity toward the region to be illuminated. In a circular implementation, the deflector 385 would be conical. Of course, for applications using other fixture shapes, the deflector may be formed by two or more panels of desired sizes and shapes, e.g. as in FIGS. 1, 2 and 8-10. The interior surface 389 of the deflector 385 is reflective. As in the earlier examples, all or portions of the reflective deflector surface(s) may be diffusely reflective, quasi-specular, specular or combinations thereof.

As shown in FIG. 11, a small opening at a proximal end of the deflector 385 is coupled to the aperture 377 of the optical integrating cavity 311. The deflector 385 has a larger opening at a distal end thereof. The angle of the interior surface 389 and size of the distal opening of the deflector 385 define an angular field of radiant energy emission from the apparatus 370.

The large opening of the deflector 385 is covered with a grating, a plate or the exemplary lens 387. The lens 387 may be clear or translucent to provide a diffuse transmissive processing of the light passing out of the large opening. Prismatic materials, such as a sheet of microprism plastic or glass also may be used. In applications where a person may look directly at the fixture 370 from the illuminated region, it is preferable to use a translucent material for the lens 387, to shield the observer from directly viewing the lamp 375.

The fixture 370 thus includes a deflector 385 and lens 387, for optical processing of the integrated light emerging from the cavity 371 via the aperture 377. Of course, other optical processing elements may be used in place of or in combination with the deflector 385 and/or the lens 387.

In the fixture of FIG. 11, the lamp 375 provides substantially white light of relatively high intensity. The integration of the light from the LEDs 379 in the cavity 375 supplements the light from the lamp 375 with additional colors, and the amounts of the different colors of light from the LEDs can be precisely controlled. Control of the light added from the LEDs can provide color correction and/or adjustment, as discussed above relative to the embodiment of FIG. 10.

As shown by the discussion above, each of the various radiant energy emission systems with multiple color sources and an optical cavity to combine the energy from the sources provides a highly effective means to control the color produced by one or more fixtures. The output color characteristics are controlled simply by controlling the intensity of each of the sources supplying radiant energy to the chamber.

Settings for a desirable color are easily reused or transferred from one system/fixture to another. If color/temperature/balance offered by particular settings are found desirable, e.g. to provide special effects lighting on signage displayed at a number of different locations, it is a simple matter to record those settings from operation of one sign and apply them to similar fixtures forming signs at the other locations.

The methods for defining and transferring set conditions can utilize manual recordings of settings and input of the settings to the different lighting systems. However, it is preferred to utilize digital control, in systems such as described above relative to FIGS. 10 and 12. Once input to a given lighting system, a particular set of parameters for a product or individual become another 'preset' lighting recipe stored in digital memory, which can be quickly and easily recalled and used each time that the particular product or person is to be illuminated.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A lighting fixture, for a luminous lighting application, the fixture comprising:
    a first of source of light of a first wavelength;
    a second source of light of a second wavelength, the second wavelength being different from the first wavelength;
    an optical cavity having a diffusely reflective interior surface for receiving and combining light of the first and second wavelengths from the sources, and having an aperture for allowing emission of combined light of both the first wavelength and the second wavelength; and
    a reflective deflector shaped like a number, character, letter, or symbol, having a proximal opening coupled to the aperture of the optical cavity, for directing the combined light emitted through the aperture so as to provide a visible luminous representation of the number, character, letter, or symbol.

2. The lighting fixture of claim 1, further comprising an extruded body member, wherein the optical cavity and the reflective deflector are formed by reflective surfaces of the extruded body member.

3. The lighting fixture of claim 1, further comprising a transmissive light diffusing member across a distal opening of the reflective deflector.

4. The lighting fixture of claim 1, wherein the aperture is shaped like a number, character, letter, or symbol.

5. The lighting fixture of claim 1, wherein the reflective deflector has a reflective inner surface coupled to the aperture to deflect at least some of the combined light, and at least a substantial portion of the reflective inner surface of the deflector exhibits a diffuse reflective characteristic with respect to the combined light.

6. The lighting fixture of claim 5, wherein:
    a first portion of the reflective inner surface of the deflector exhibits a diffuse reflective characteristic with respect to the combined light; and
    a second portion of the reflective inner surface of the deflector exhibits a specular reflective characteristic with respect to the combined light.

7. The lighting fixture of any of claims 1-6, in combination with control circuitry coupled to the first and second sources for establishing output intensity of light output of each of the sources, so as to set a spectral characteristic of combined light emitted by the fixture.

8. The lighting fixture of any of claims 1-6, wherein:
    the first source comprises one or more light emitting diodes for emitting light of a first visible color; and
    the second source comprises one or more light emitting diodes for emitting light of a second visible color, wherein the second color is different from the first color.

9. The lighting fixture of claim 8, wherein:
    the one or more first color light emitting diodes comprise an initially active light emitting diode for emitting light of the first color and an initially inactive light emitting diode for emitting light of the first color on an as needed basis; and
    the one or more second color light emitting diodes comprises an initially active light emitting diode for emitting light of the second color and an initially inactive light emitting diode for emitting light of the second color on an as needed basis.

10. The lighting fixture of claim 9, further comprising a third source for supplying substantially white light into the optical cavity for combination with the light of the first and second wavelengths.

11. The lighting fixture of claim 10, wherein the third source comprises at least one white light emitting diode, halide light bulb, quartz halogen light bulb, incandescent light bulb or fluorescent light bulb.

12. The lighting fixture of any of claims 1-6, further comprising a third source for supplying light of a third wavelength into the optical cavity for combination with the light of the first and second wavelengths, the third wavelength being different from the first wavelength and from the second wavelength.

13. The lighting fixture of claim 12, wherein:
    the first source comprises one or more light emitting diodes for emitting light of a first visible color;
    the second source comprises one or more light emitting diodes for emitting light of a second visible color, wherein the second color is different from the first color; and
    the third source comprises one or more light emitting diodes for emitting light of a third visible color, wherein the third color is different from the first color and from the second color.

14. The lighting fixture of claim 13, wherein the first, second and third colors are red, green and blue, respectively.

15. A plurality of lighting fixtures as specified in any of claims 1-6 arranged to spell out a word or phrase.

16. A lighting network comprising:
    a plurality of lighting fixtures, each lighting fixture comprising:
        a) a first of source of light of a first wavelength;
        b) a second source of light of a second wavelength, the second wavelength being different from the first wavelength;
        c) an optical cavity having a diffusely reflective interior surface for receiving and combining light of the first and second wavelengths from the sources, and having an aperture for allowing emission of combined light of both the first wavelength and the second wavelength; and
        d) a reflective deflector shaped like a number, character, letter, or symbol, having a proximal opening coupled to the aperture of the optical cavity, for directing the combined light emitted through the aperture so as to provide a visible luminous representation of the number, character, letter, or symbol;

a plurality of control circuits, each coupled to the first and second sources of a respective one of the lighting fixtures for establishing output intensity of light output of each of the sources of the respective lighting fixture, so as to set a spectral characteristic of the combined light emitted by the respective lighting fixture; and a master controller communicatively networked to the control circuits, for providing a common control of all light emissions by the lighting fixtures.

17. The lighting network of claim 16, wherein the lighting fixtures are arranged to spell out a word or phrase.

18. A lighting fixture, comprising:
a first of source of light of a first wavelength;
a second source of light of second wavelength, the second wavelength being different from the first wavelength;
an extruded body member;
a diffusely reflective optical integrating cavity formed by at least one first reflective interior surface of the extruded body member, for receiving and combining light of the first and second wavelengths from the sources, and having an aperture for allowing emission of combined light of both the first wavelength and the second wavelength; and
a reflective deflector formed by at least one second reflective interior surface of the extruded body member, the reflective deflector having a proximal opening coupled to the aperture of the optical integrating cavity, for directing the combined light emitted through the aperture to a desired region.

19. The lighting fixture of claim 18, wherein the reflective deflector has a shape like a number, character, letter, or symbol, for directing the combined light emitted through the aperture so as to provide a luminous representation of the number, character, letter, or symbol.

20. The lighting fixture of claim 19, wherein the aperture is shaped like a number, character, letter, or symbol.

21. The lighting fixture of claim 19, wherein the at least one second reflective interior surface exhibits a diffuse reflective characteristic with respect to the combined light.

22. The lighting fixture of any of claims 18-21, in combination with control circuitry coupled to the first and second sources for establishing output intensity of light output of each of the sources, so as to set a spectral characteristic of combined light emitted by the fixture.

23. The lighting fixture of any of claims 18-21, wherein:
the first source comprises one or more light emitting diodes for emitting light of a first visible color; and
the second source comprises one or more light emitting diodes for emitting light of a second visible color, wherein the second color is different from the first color.

24. The lighting fixture of claim 23, wherein:
the one or more first color light emitting diodes comprise an initially active light emitting diode for emitting light of the first color and an initially inactive light emitting diode for emitting light of the first color on an as needed basis; and
the one or more second color light emitting diodes comprises an initially active light emitting diode for emitting light of the second color and an initially inactive light emitting diode for emitting light of the second color on an as needed basis.

25. The lighting fixture of claim 24, further comprising a third source for supplying substantially white light into the optical cavity for combination with the light of the first and second wavelengths.

26. The lighting fixture of claim 25, wherein the third source comprises at least one white light emitting diode, halide light bulb, quartz halogen light bulb, incandescent light bulb or fluorescent light bulb.

27. The lighting fixture of any of claims 18-21, further comprising a third source for supplying light of a third wavelength into the optical cavity for combination with the light of the first and second wavelengths, the third wavelength being different from the first wavelength and from the second wavelength.

28. The lighting fixture of claim 27, wherein:
the first source comprises one or more light emitting diodes for emitting light of a first visible color;
the second source comprises one or more light emitting diodes for emitting light of a second visible color, wherein the second color is different from the first color; and
the third source comprises one or more light emitting diodes for emitting light of a third visible color, wherein the third color is different from the first color and from the second color.

29. The lighting fixture of claim 28, wherein the first, second and third colors are red, green and blue, respectively.

30. A plurality of lighting fixtures as specified in any of claims 18-21, wherein:
the reflective deflector in each respective fixture has a shape like a respective number, character, letter, or symbol, for directing the combined light emitted through the aperture so as to provide a visible luminous representation of the respective number, character, letter, or symbol;
the aperture in each respective fixture is shaped like the respective number, character, letter, or symbol; and
the plurality of lighting fixtures are arranged to spell out a word or phrase.

31. A lighting network comprising:
a plurality of lighting fixtures, each lighting fixture comprising:
a) a first of source of light of a first wavelength;
b) a second source of light of second wavelength, the second wavelength being different from the first wavelength;
c) an extruded body member;
d) a diffusely reflective optical integrating cavity formed by at least one first reflective interior surface of the extruded body member, for receiving and combining light of the first and second wavelengths from the sources, and having an aperture for allowing emission of combined light of both the first wavelength and the second wavelength; and
e) a reflective deflector formed by at least one second reflective interior surface of the extruded body member, the reflective deflector having a proximal opening coupled to the aperture of the optical integrating cavity, for directing the combined light emitted through the aperture to a desired region;
a plurality of control circuits, each coupled to the first and second sources of a respective one of the lighting fixtures for establishing output intensity of light output of each of the sources of the respective lighting fixture, so as to set a spectral characteristic of the combined light emitted by the respective lighting fixture; and
a master controller communicatively networked to the control circuits, for providing a common control of all light emissions by the lighting fixtures.

32. The lighting network of claim 31, wherein:

the reflective deflector in each respective fixture has a shape like a respective number, character, letter, or symbol, for directing the combined light emitted through the aperture so as to provide a visible luminous representation of the respective number, character, letter, or symbol;

the aperture in each respective fixture is shaped like the respective number, character, letter, or symbol; and the plurality of lighting fixtures are arranged to spell out a word or phrase.

* * * * *